(12) United States Patent
Zachmeyer (10) Patent No.: US 7,065,858 B1
(45) Date of Patent: Jun. 27, 2006

(54) METHOD FOR WELDING COMPONENTS OF A DISK DRIVE HEAD SUSPENSION

(75) Inventor: David J. Zachmeyer, Hutchinson, MN (US)

(73) Assignee: Hutchinson Technology Incorporated, Hutchinson, MN (US)

(*) Notice: Subject to any disclaimer, the term of this patent is extended or adjusted under 35 U.S.C. 154(b) by 398 days.

(21) Appl. No.: 10/008,365

(22) Filed: Nov. 13, 2001

Related U.S. Application Data (60) Provisional application No. 60/248,450, filed on Nov. 14, 2000.

(51) Int. Cl.
*B11B 5/127* (2006.01)
*H04R 31/00* (2006.01)

(52) U.S. Cl. .............. 29/603.06; 29/603.03; 29/839; 29/840; 219/121.63; 219/121.64; 228/110.1; 228/190; 360/244.2; 360/244.8; 360/245.4

(58) Field of Classification Search ........... 29/603.03, 29/603.06, 603.07, 839, 840, 843, 860; 219/121.63, 219/121, 121.64; 228/110.1, 190; 360/244.2, 360/244.8, 254.4, 244, 245.4
See application file for complete search history.

(56) References Cited

U.S. PATENT DOCUMENTS

| | | | |
|---|---|---|---|
| 4,755,652 A | 7/1988 | La Rocca | 219/121.64 |
| 4,786,999 A | 11/1988 | Tanaka et al. | 360/104 |
| 5,198,945 A | 3/1993 | Blaeser et al. | 360/104 |
| 5,201,458 A | 4/1993 | Hagen | 228/199 |
| 5,737,152 A | 4/1998 | Balakrishnan | 360/104 |
| 5,748,409 A | 5/1998 | Girard et al. | 360/104 |
| 5,754,368 A | 5/1998 | Shiraishi et al. | 360/104 |
| 5,793,569 A | 8/1998 | Christianson et al. | 360/104 |
| 5,812,344 A | 9/1998 | Balakrishnan | 360/104 |
| 5,821,494 A * | 10/1998 | Albrecht et al. | 219/121.64 |
| 5,973,885 A | 10/1999 | Hanrahan et al. | 360/104 |
| 6,032,352 A * | 3/2000 | Furay et al. | 29/603.03 |
| 6,160,684 A | 12/2000 | Heist et al. | 360/244.5 |
| 6,181,526 B1 | 1/2001 | Summers | 360/245.9 |
| 6,261,701 B1 * | 7/2001 | Fields, Jr. | 428/577 |
| 6,371,760 B1 * | 4/2002 | Zavilenski et al. | 433/8 |
| 6,417,995 B1 * | 7/2002 | Wu et al. | 360/245 |

FOREIGN PATENT DOCUMENTS

JP      63040692 A  *  2/1988

OTHER PUBLICATIONS

"Enhancing suspension performance with 3-ply laminated load beam"; Thaveeprungsriporn, V.; Sittipongpanich, K.; Imoeb, P.; Chayapancha, M.; Magnetic Recording Conference, 2002. Digest of the Asia-Pacific, Aug. 27-29, 2002; pp.:TU-P-22-01-TU-P-22-02.*

* cited by examiner

*Primary Examiner*—Paul D. Kim
(74) *Attorney, Agent, or Firm*—Faegre & Benson LLP (57) ABSTRACT

A method of affixing head suspension components to one another using an edge weld formed at the edge of one head suspension assembly component positioned in an overlapping fashion relative to another head suspension assembly component, and an apparatus assembled by the method.

25 Claims, 11 Drawing Sheets

METHOD FOR WELDING COMPONENTS OF A DISK DRIVE HEAD SUSPENSION

REFERENCE TO RELATED APPLICATION

This application claims the benefit of U.S. Provisional Application Ser. No. 60/248,450 filed on Nov. 14, 2000 and entitled "Edge welding of disk drive head suspension components" which is hereby incorporated by reference in its entirety.

TECHNICAL FIELD

The present invention is related to a method of assembling head suspension components for use in a magnetic data storage device. The method specifically relates to the formation of welds that are used to attach head suspension components together to make a head suspension assembly. The novel method forms an edge weld on an edge of one of the components to be attached, which fixes the component to at least one other adjacent component.

BACKGROUND OF THE INVENTION

A head suspension assembly is an apparatus in a hard disk drive that positions a read/write head assembly over the spinning surface of a data storage device (e.g. a magnetic hard disk). The head suspension assembly is one of the smallest and most delicate components of a disk drive. The head suspension assembly includes a suspension assembly and a head assembly, with the head assembly positioned at a distal end of the suspension assembly. The suspension assembly is an elongated structure having a spring region or element therein. Suspension assemblies act in a similar fashion to the needle arm in a record player, positioning the head assembly generally less than fifteen nanometers from a surface of a spinning disk in the disk drive. The suspension assembly is attached to an actuator arm, which rotatably positions the suspension assembly and head assembly into the proper position for reading from or writing to the magnetic disk.

Suspension assemblies generally include component elements such as an elongated load beam, a flexure, and a base plate or other mounting means. The load beam is attached to the base plate or other mounting means at a mounting region of the load beam, located at a proximal end of the load beam. Extending from the mounting region of the load beam is a spring region (also known as a "radius region"), which permits some degree of bending in the assembly. The flexure is attached to the load beam at least at a distal end of the load beam. Between the spring region and the flexure is a relatively rigid region of the load beam. In some configurations, a stiffener is attached to the load beam or other component to provide added rigidity or to provide a preload force to the head assembly; see, for instance, U.S. Pat. No. 5,793,569 to Christianson, et al.

The read/write head assembly is mounted to the flexure. The flexure provides gimballing support to the head assembly, so that the head assembly can closely track the contours of the surface of the spinning disk. The head assembly includes an air bearing slider and a read/write magnetic transducer formed on the slider. The slider is a head assembly element aerodynamically shaped to use the air stream generated by the spinning disk to produce a lift force which supports the head assembly above the disk.

During operation of the disk drive, the whole suspension assembly is designed to work together to maintain the head assembly at a desired orientation with respect to the surface of the spinning disk. A design goal for magnetic disk drives is to "fly" the head at the closest possible distance and at a desired attitude with respect to the surface of the disk. As the disk spins beneath the head, an air bearing is formed between the disk and the slider as air is forced under the slider. The air bearing prevents the head assembly from "crashing" into the surface of the disk. Simultaneously, a compensating force is required to prevent the air bearing from forcing the head assembly too far away from the surface of the disk. The spring region of the load beam, which is usually made from stainless steel sheets 25 to 100 μm thick, generally provides a force known as a gram load to compensate for the lift that results from the air bearing.

As the head assembly hovers above the magnetic hard disk, electric signals must be coupled to the read/write head. Early technology used wires that ran from the head to the controlling electronics. Modern head suspension assemblies utilize integral conductive leads, or "traces," that allow communication with the read/write head and eliminate the need for discrete wires; see, for example, U.S. Pat. Nos. 5,812,344 and 5,737,152 to Balakrishnan and U.S. Pat. No. 5,754,368 to Shiraishi, et al. A suspension component possessing integral leads can be referred to as an integrated lead suspension component. For example, a flexure incorporating integrated traces can be called an integrated lead flexure.

Welds are often used for attachment of two or more suspension components during manufacture of the suspension assembly. By way of example, the load beam and the flexure may be attached together by welds. During welding, intense heat is applied to weld points on the surface of the elements to be welded. A zone of molten material is created, permitting material from the elements to flow and bond. The molten zone is then allowed to cool. Since the zone loses heat to the outside atmosphere and to the surrounding material, the zone cools from the outside in, contracting and solidifying as it cools. Once the zone has cooled, the solidified material holds the suspension assembly elements together.

Welds for attaching components can be formed by, for example, laser-welding or spot-welding techniques. Laser welding is performed using a laser beam, which locally heats a material by irradiation. See, for instance, U.S. Pat. No. 5,201,458 to Hagen, which discusses the dynamics of the formation of a laser weld. Spot welding is done by discharging a high electrical current through the material to be welded using electrodes positioned on opposing surfaces of the materials to be welded. Resistive heating of the material melts the material and creates the weld. See, for instance, U.S. Pat. No. 4,755,652 to La Rocca.

Although welding is the most common means of attaching head suspension components together to make head suspension assemblies, problems have been observed with the use of welds. One major drawback is that such welds can leave residual stresses in the component structures, due to the contraction of the component material during cooling. Residual stresses have been found to affect static attitude of the head suspension assembly. Efforts to reduce residual stresses have included the use of holes in the components near the welds, preheating of the weld area prior to welding, or application of pressure after welding; see U.S. Pat. No. 5,748,409 to Girard, et al. and U.S. Pat. No. 5,201,458 to Hagen.

A further problem associated with welding that has been identified is a "flapping" phenomenon that results when a weld is located on an interior region of a surface to be attached. When a weld is used near the center of the contact area between components, a gap may form between the surfaces of the attached components. As the disk rotates and creates an air current that impinges upon the suspension assembly, air can be forced into the gap. A vibration, or "flapping," may result because of the gap between the components. See U.S. Pat. No. 4,786,999 to Tanaka, et al., which attempts to remedy the problem by strategically distributing a plurality of welds.

SUMMARY OF THE INVENTION

The present invention is a novel method for securing head suspension components to one another, in which a weld is formed at an edge of a first component placed in an overlapping position relative to a surface of a second component such that the surface of the second component extends beyond the edge of the first component. Conventional spot-welding or laser-welding techniques can be used to form the weld after the components have been positioned with respect to each other. After positioning, of the components, the weld is made so that only part of the weld spot lies within an outer perimeter of the first component. Preferably, the weld spot is centered at a "step" that is formed where the edge of the first component overlaps the surface of the second component.

One benefit of the present invention is reduction or elimination of component separation and the "flapping" phenomenon. Locating the weld spot at the edge of the first component reduces or eliminates the gap between components. Elimination of the "flapping" phenomenon avoids unwanted vibration in the head suspension assembly.

The method of the present invention can also be used to reduce residual stresses that normally accompany the use of welds. Since in an edge weld the weld spot is constrained only on one side by the first component, the molten metal is able to expand outward from the center of the weld spot and away from the interior of the first component. Expansion or contraction of the molten metal in the unconstrained direction does not result in residual stress. Prior methods placed the weld spot fully in the interior region of both components, leaving no in-plane direction for free expansion and contraction of the molten metal, thus resulting in residual stresses in the components after the weld was formed.

A further benefit of the method of the present invention is that the physical dimensions of components can be reduced. For instance, a more narrow flexure can be fabricated and used in a head suspension assembly that is assembled using the edge weld technique. The reduction in size can be achieved because the weld spot is not located within the interior of the component's surface but rather extends only partially onto the component. Size reduction is an ongoing objective in the design of magnetic recording devices. A reduction in physical dimensions is accompanied by a reduction in the mass of the suspension, which can lead to improved seek energy and resonance characteristics.

Other performance benefits may be realized when the present method is used for the production of head suspension assemblies. Resonant frequency modes of the suspension assembly or of the flexure may be improved. In the case of an integrated lead flexure, for example, improved resonance may be obtained by placing the welds at the edge of the flexure while moving the integrated lead traces closer to the component centerline. Suspension resonance characteristics can be improved by enabling component and suspension mass to be moved in toward the suspension center. More reliable radius definition in the spring region is enabled by ensuring line contact when attaching hinges on multi-component suspensions. In some multi-component configurations, line contact cannot be assured unless the edge-welding technique of the present invention is utilized.

Processing benefits can be realized in the production of suspension head assemblies by the present method as well. Reduction of component size allows a greater number of components to be stamped or etched from a given area of sheet material, resulting in lower production costs and less waste of material. Smaller clamping areas can be used when forming the weld, which provides reduced tool design constraints, and permits greater flexibility in product design.

BRIEF DESCRIPTION OF THE DRAWINGS

FIG. 2b is a fragmentary plan view of the first side of the component assembly shown in FIG. 2a.

FIG. 4b is an enlarged view of the edge weld shown in FIG. 4a.

DETAILED DESCRIPTION OF THE INVENTION

Figure 1:
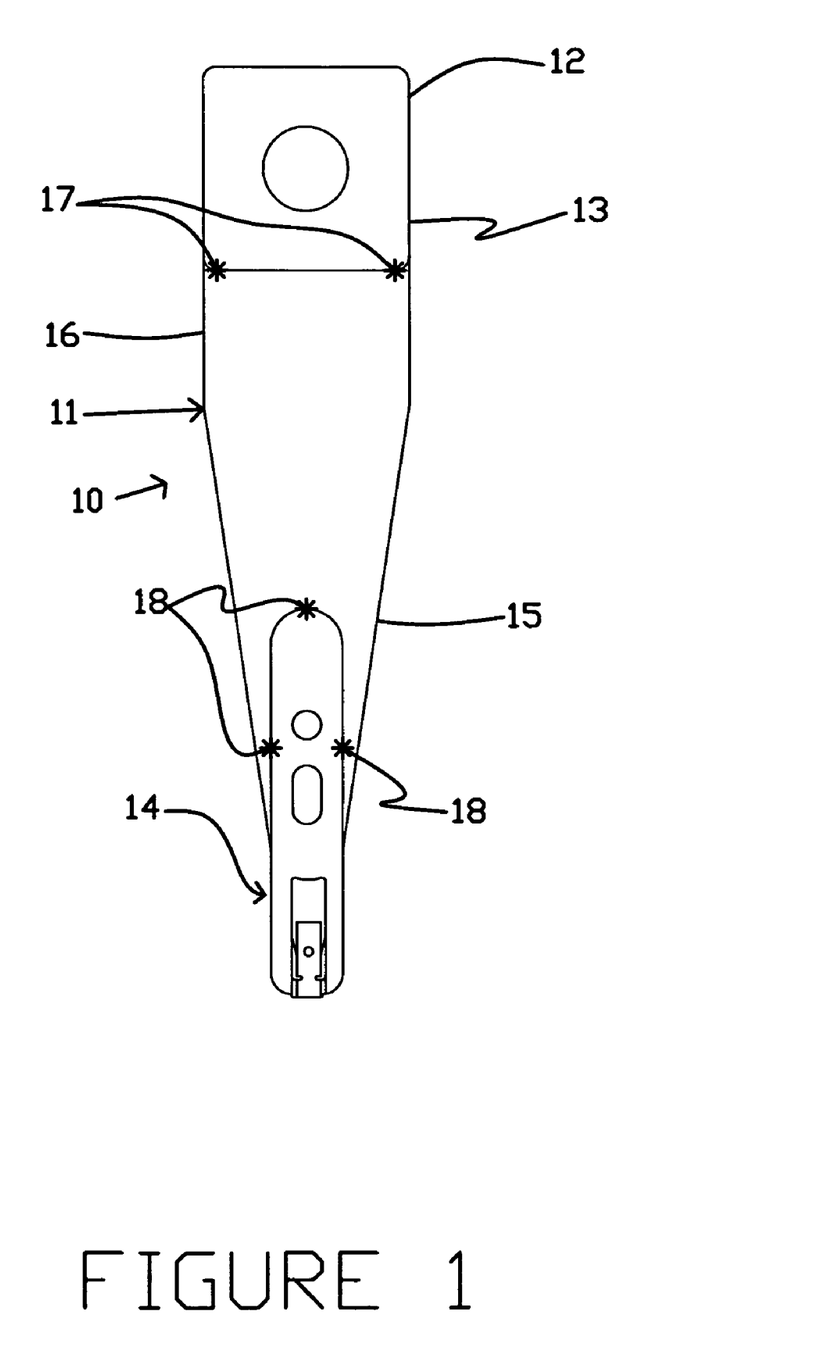
FIG. 1 is a plan view of a head suspension assembly useful in the practice of the present invention.

The method of the present invention is useful in attaching head suspension components together during the manufacture of a head suspension assembly, using a weld at a lap-type joint. FIG. 1 shows a head suspension assembly 10. A load beam 11 is attached to a base plate 12 at a mounting region 13 of the load beam, located at a proximal end of the load beam 11. Extending from the mounting region 13 of the load beam 11 is a spring region 16, which permits some degree of bending in the assembly 10. A flexure 14 is attached to the load beam 11 at least at a distal end of the load beam 11. Between the spring region 16 and the flexure 14 is a relatively rigid region 15 of the load beam 11. Preferably, the head suspension assembly components are fabricated primarily from stainless steel.

A known alternative to the head suspension assembly shown in FIG. 1 is a unitary-type load beam and actuator arm head suspension assembly. The unitary-type head suspension assembly (not shown) is a configuration where the actuator arm or base plate is integral with the load beam. A second known alternative to the assembly shown in FIG. 1 is the multi-component suspension. By way of example, one multi-component configuration has as distinct components a base plate, a load beam mounting region which includes a spring region, a load beam rigid region, and a flexure. Other multi-component configurations are also known. The method of the present invention may be used in assembling multi-component suspensions, head suspension assemblies of the unitary type or other weldable head suspension assembly types.

The present invention can be used to attach two or more head suspension components together. Typically, the head suspension components to be attached will include substantially planar regions at a mating interface in the vicinity of attachment points. However, other shapes can be used, so long as there is sufficient mating of the components in the vicinity of the attachment points.

The method of the present invention includes the steps of: a) positioning a first head suspension component with respect to a second head suspension component in such a manner that a surface of the second component contacts a major surface of the first component at an edge of the first component, and a perimeter of the surface of the second component extends beyond the edge of the first component, and b) forming an edge weld at the edge of the first component, the edge weld extending beyond the edge onto the first and second components. The term "edge" refers to a minor surface of the first component that meets the major surface of the first component; i.e., the edge is a relatively narrow side surface of the first component.

Figure 2A:
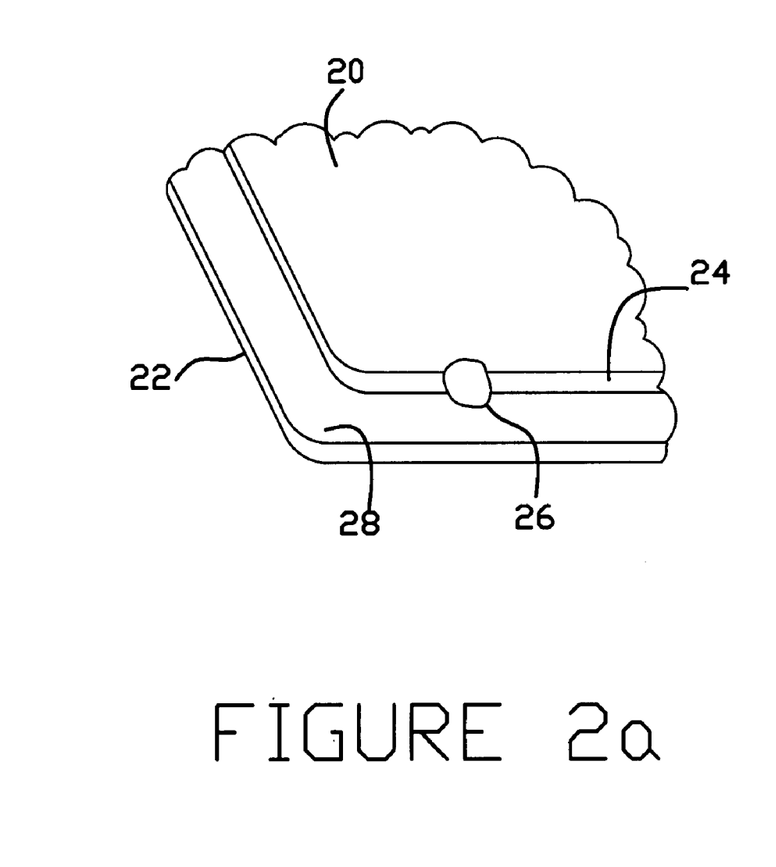
FIG. 2a is a fragmentary perspective view of a first side of a component assembly, showing an edge weld of the present invention joining a first head suspension assembly component and a second head suspension assembly component.
Figure 2B:
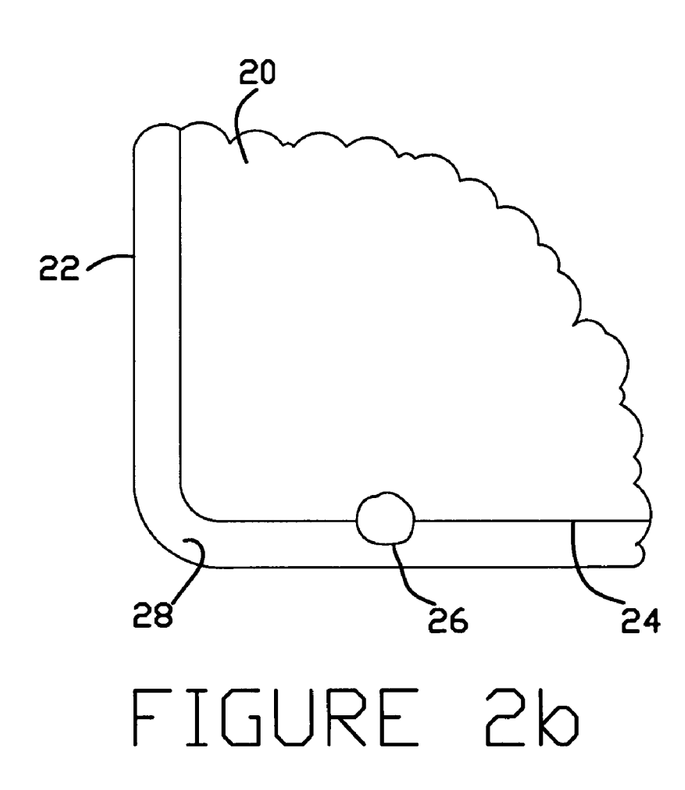

FIGS. 2a and 2b show a view of the edge weld formed by the method of the present invention. In the positioning step of the method, a first component 20 is brought into contact with a surface 28 of a second component 22 in such a manner that an edge 24 of the first component 20 is located over the interior of the surface 28 of the second component 22. In other words, at least a portion of the periphery of the surface 28 of the second component 22 is positioned outward from the edge 24. Positioning the components in this manner results in the formation of a "step," as shown in FIG. 2a. It may be necessary to clamp the components 20 and 22 together in order to secure the relative positioning prior to the formation of the edge weld.

After positioning of the components 20 and 22, an edge weld 26 is formed at the edge 24 of the first component 20, which secures the first component 20 to the interior region of surface 28 of the second component 22. The edge weld 26 is positioned at a location such that at least part of edge 24 is encompassed within the resulting edge weld 26, as shown in FIGS. 2a and 2b. FIG. 2b shows a directly overhead plan view of an edge weld 26 formed by the present method, demonstrating that part of the edge weld 26 is on surface 28 of the second component 22 and another part of the edge weld 26 is on the first component 20.

The edge weld 26 may be positioned with a major portion of the weld spot area covering surface 28 of the second component 22; alternatively, the edge weld 26 may be positioned with the greater part of the weld spot area extending into the first component 20. The most preferred method, however, is to generally center the edge weld 26 on the edge 24, as shown in FIGS. 2a and 2b.

Figure 3:
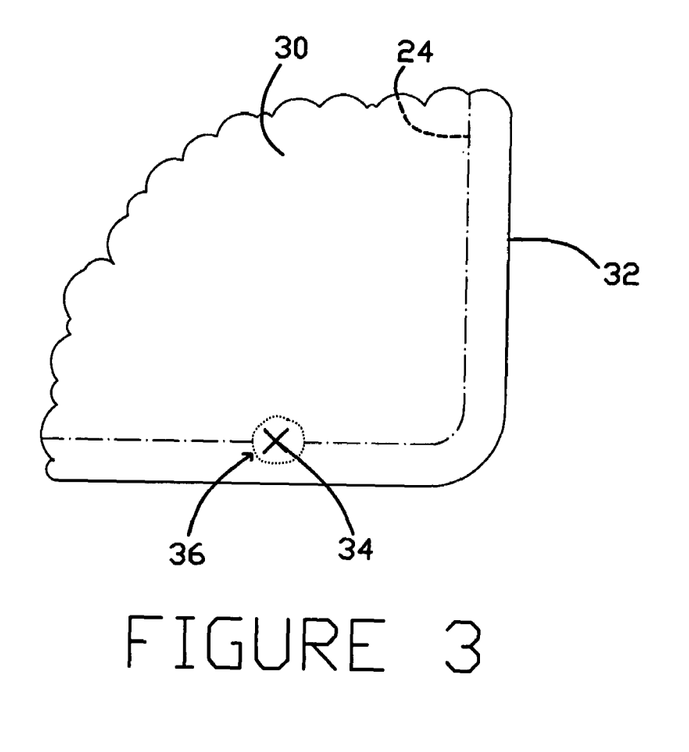
FIG. 3 is a fragmentary plan view of a second side of the component assembly opposite the side shown in FIGS. 2a and 2b, prior to edge welding.

The edge weld 26 may be formed by conventional welding techniques known in the art, including laser welding or spot welding, preferably by laser welding. The welding energy (e.g., laser energy) may be supplied from a first side of the assembled components that includes the edge 24, i.e., impinging upon the exposed surfaces shown in FIGS. 2a and 2b. Alternatively, the welding energy may be supplied from a second side of the assembled components that is opposite the first side. FIG. 3 shows a plan view of an opposite side of an assembly like that shown in FIGS. 2a and 2b but prior to formation of the edge weld. Surface 30 of the second component 32 is opposite (and is typically substantially parallel to) surface 28 of FIGS. 2a and 2b. The position of edge 24 is shown in phantom in FIG. 3. A crosshair 34 is located at the point at which the laser energy would preferably be directed in order to form the edge weld 26. The area enclosed by the dotted circle 36 represents the expected position of the resulting edge weld after laser energy is applied.

The method can be used to secure any weldable head suspension component to any other weldable component. Referring to FIG. 1, this includes, but is not limited to, the flexure 14, load beam 11, base plate 12, spring region 16, mounting region 13, and equivalents thereof, or any other weldable head suspension component in any head suspension assembly configuration. Edge weld spots 17 are shown as an example of how the present method may be used to attach the mounting region 13 of the load beam 11 to the base plate 12.

Figure 8:
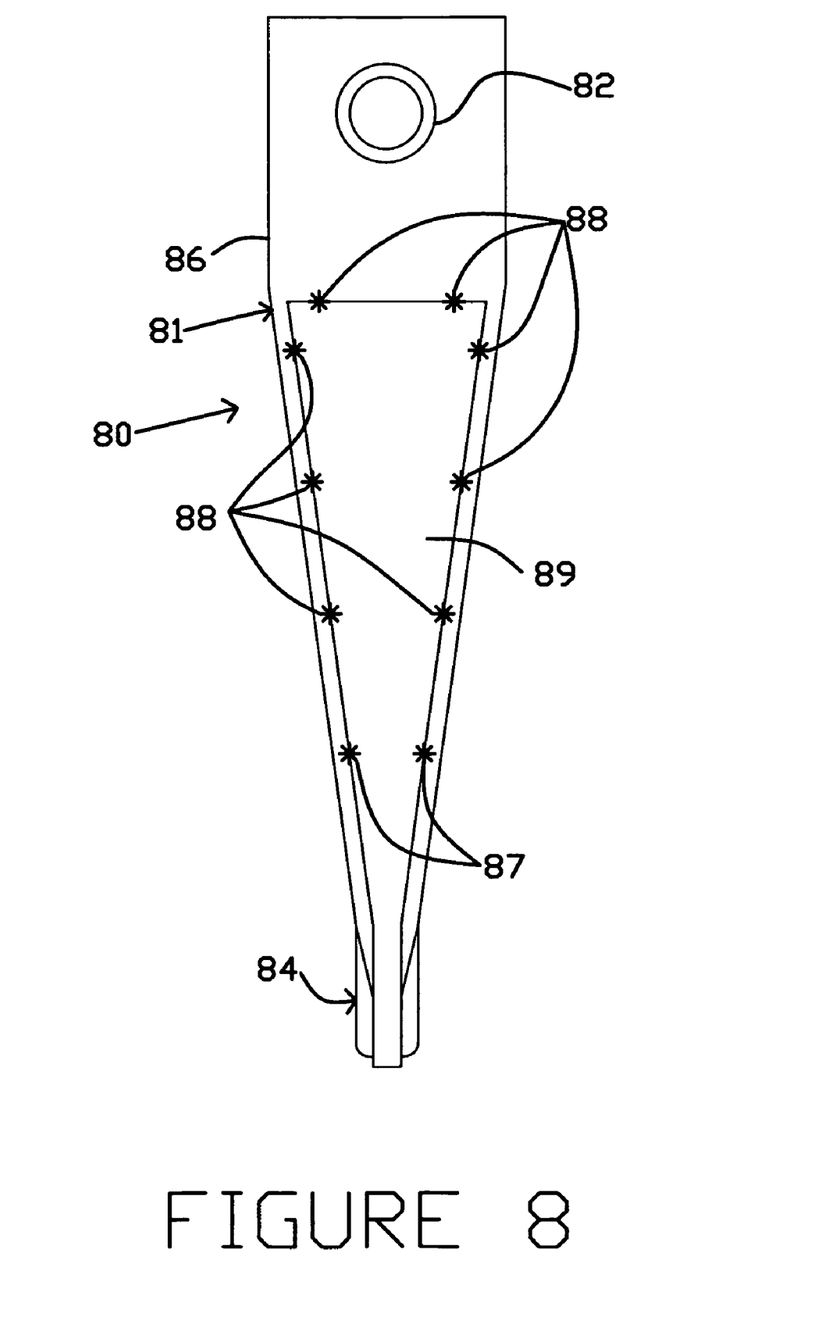
FIG. 8 an alternative configuration for a head suspension assembly, showing the use of a stiffener in the practice of the present invention.

FIG. 8 demonstrates the use of edge welds when a stiffener 89 is included in the head suspension assembly 80. In the configuration shown, base plate boss tower 82 is located at a proximal end of load beam 81. Flexure 84 is located at a distal end of load beam 81. Spring region 86 is located between the proximal and distal ends of load beam 81. Stiffener 89 is incorporated to provide stiffness to the region of load beam 81 between the spring region 86 and flexure 84. Edge weld spots 88 are shown as an example of how the present method may be used to attach stiffener 89 to load beam 81.

Figure 4A:
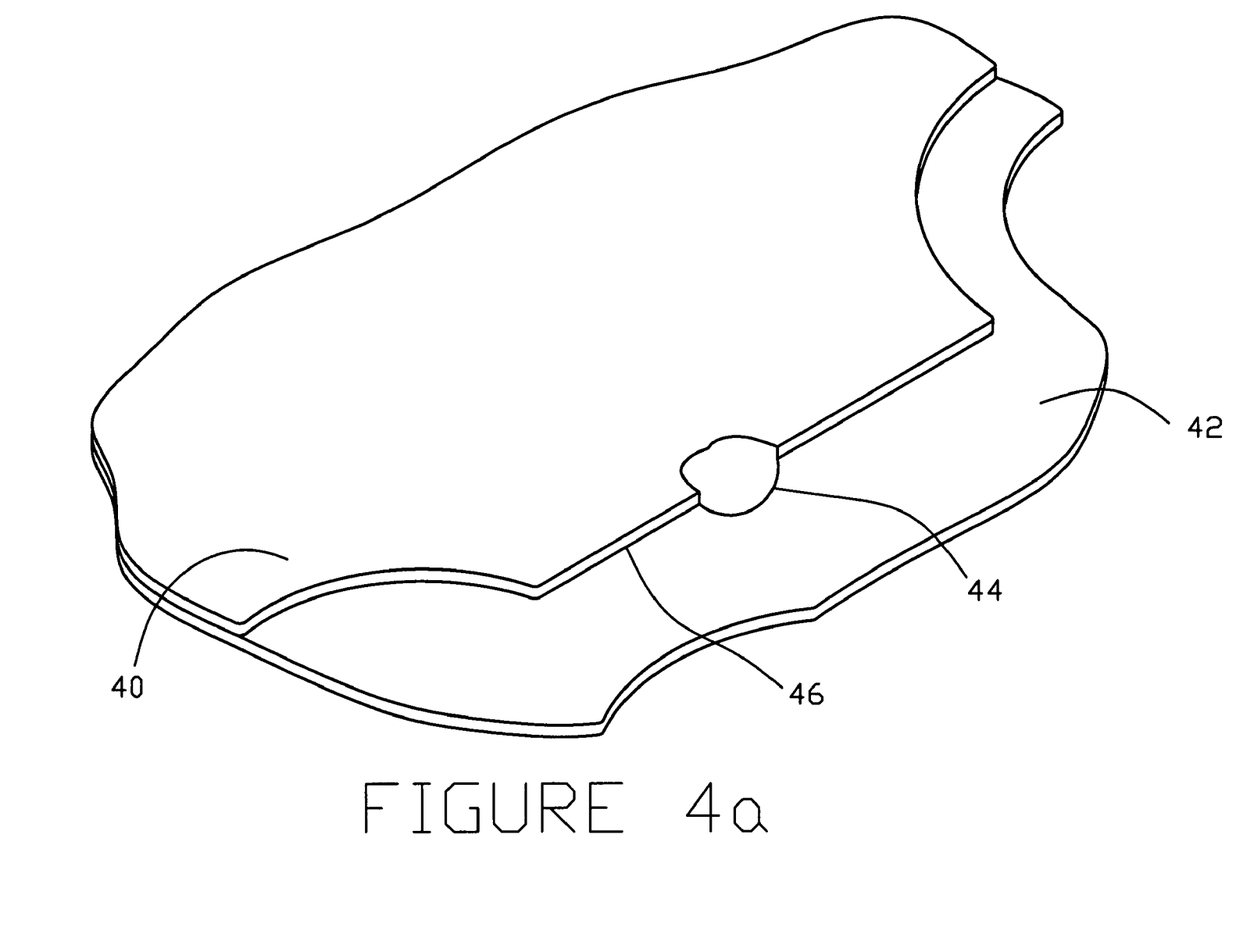
FIG. 4a is a fragmentary perspective view showing an edge weld used to attach a flexure and an arm in a unitary-type head suspension assembly.
Figure 4B:
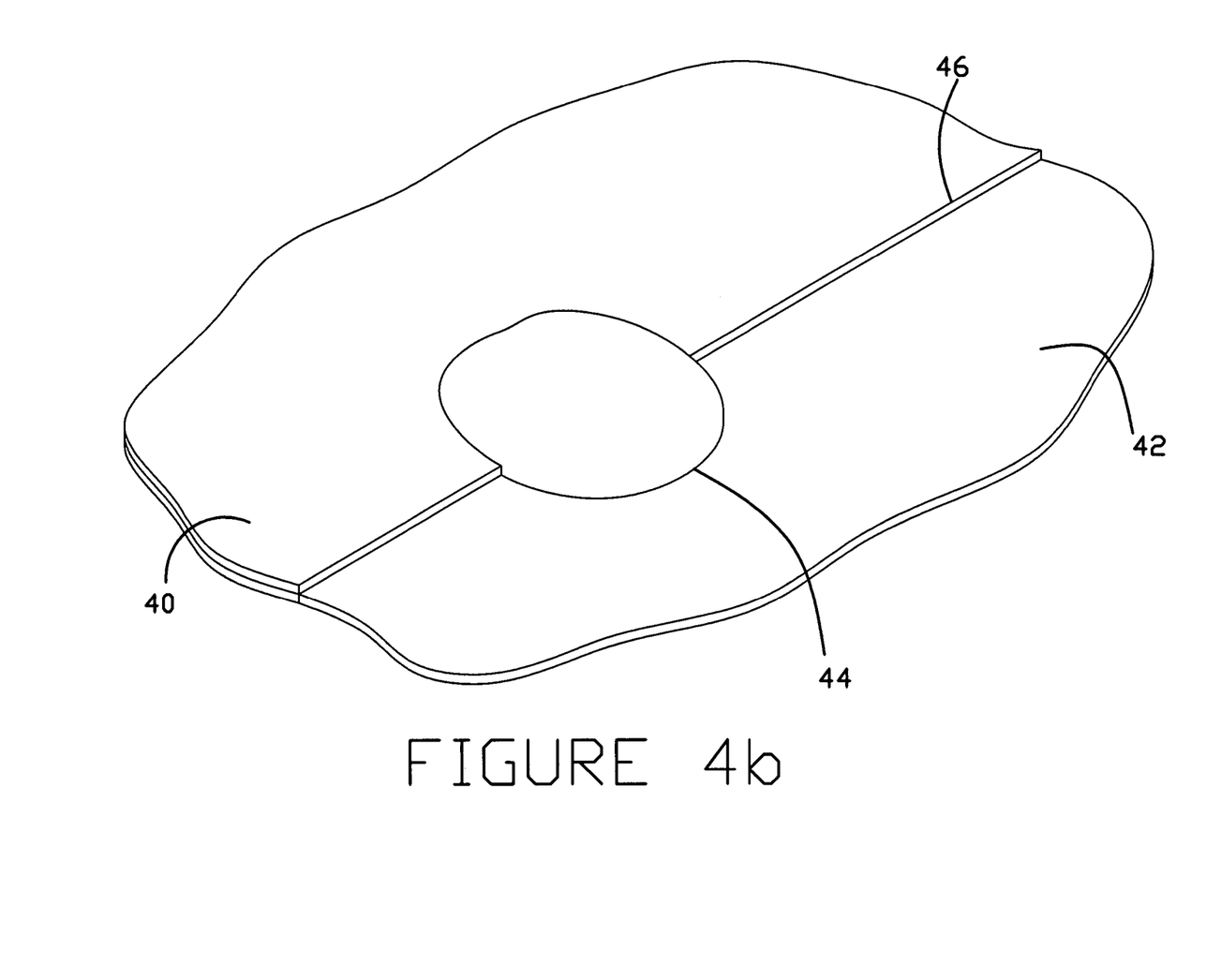

FIG. 4a demonstrates the attachment of a flexure 40 to an arm 42 via edge weld 44 at edge 46, for use in a unitary-type head suspension assembly. FIG. 4b is an enlarged view of edge weld 44 from FIG. 4a.

Referring again to FIG. 1, a preferred use of the method is to attach a flexure (such as flexure 14) to a load beam (such as load beam 11) using edge welds, as indicated by edge weld spots 18. In particular, it is preferred to attach an integrated lead flexure to a load beam.

Figure 5:
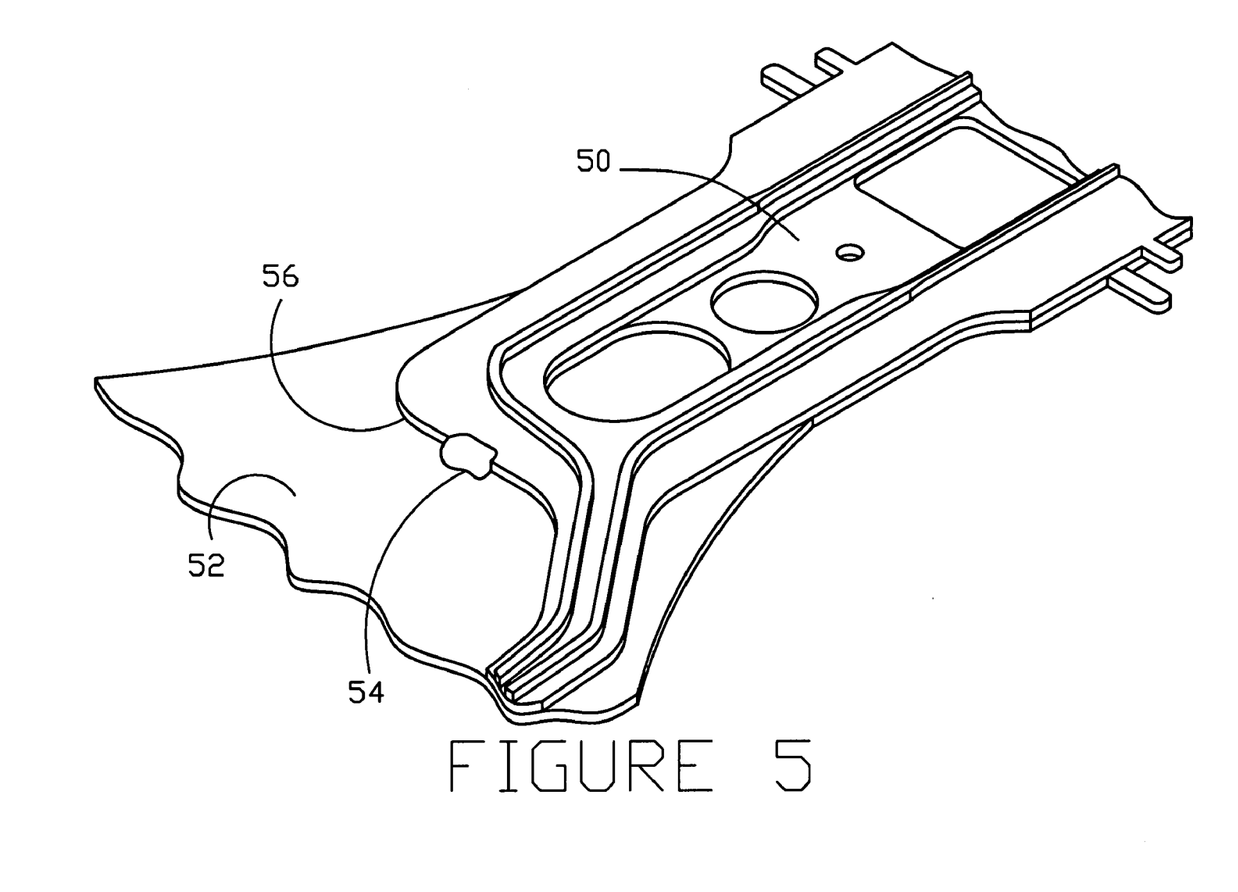
FIG. 5 is a fragmentary perspective view of an integrated lead flexure and a load beam attached by an edge weld.

FIG. 5 illustrates the attachment of an integrated lead flexure 50 to a load beam 52 via an edge weld 54 at edge 56.

Figure 6:
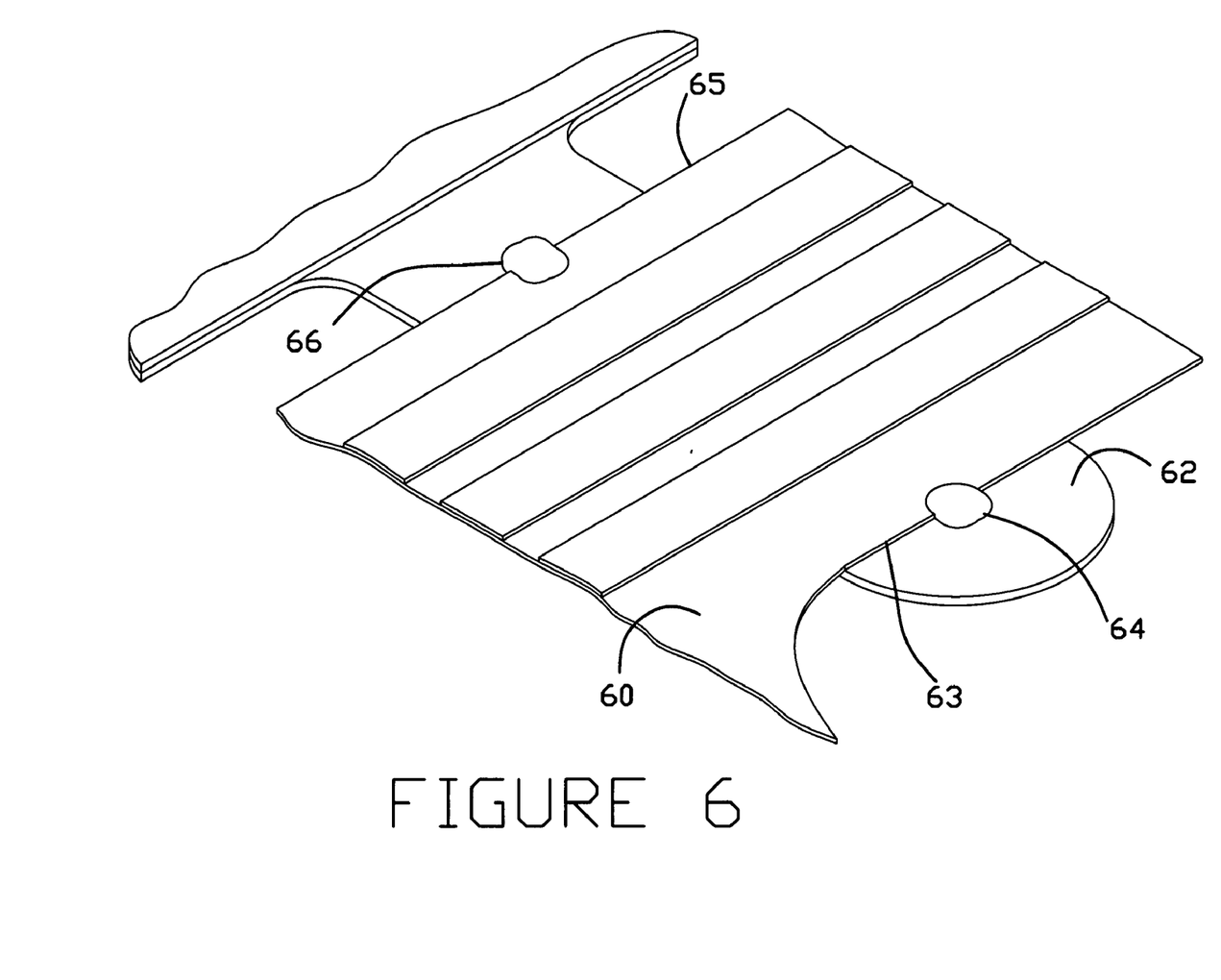
FIG. 6 is a fragmentary perspective view of an integrated lead flexure attached to a load beam tab via a pair of edge welds.

FIG. 6 shows attachment of integrated lead flexure 60 at a load beam tab 62 via a pair edge welds 64 and 66 at edges 63 and 65, respectively.

Figure 9:
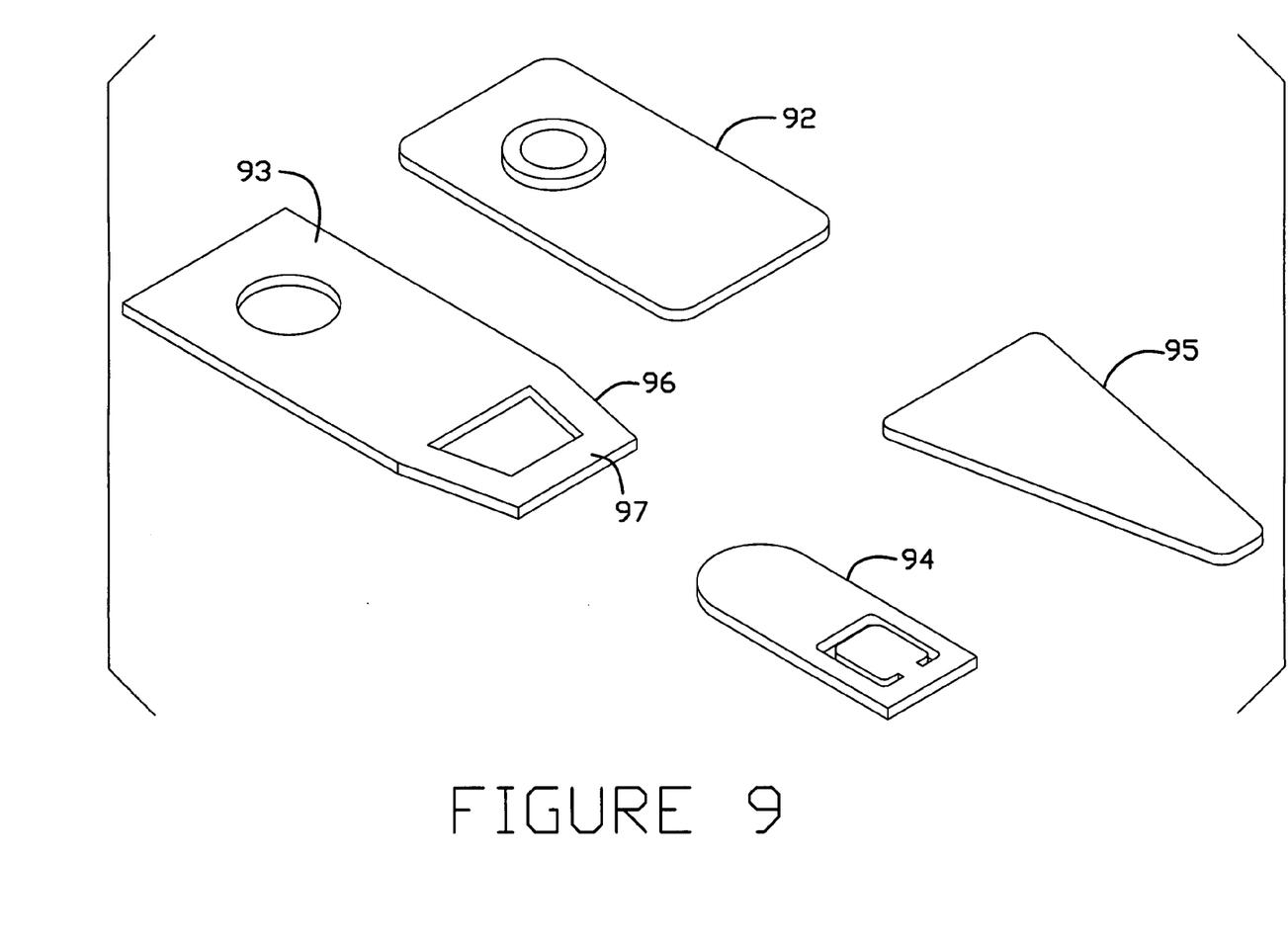
FIG. 9 is an exploded view of another embodiment, in the form of a multi-component head suspension assembly useful in the practice of the present invention.
Figure 10:
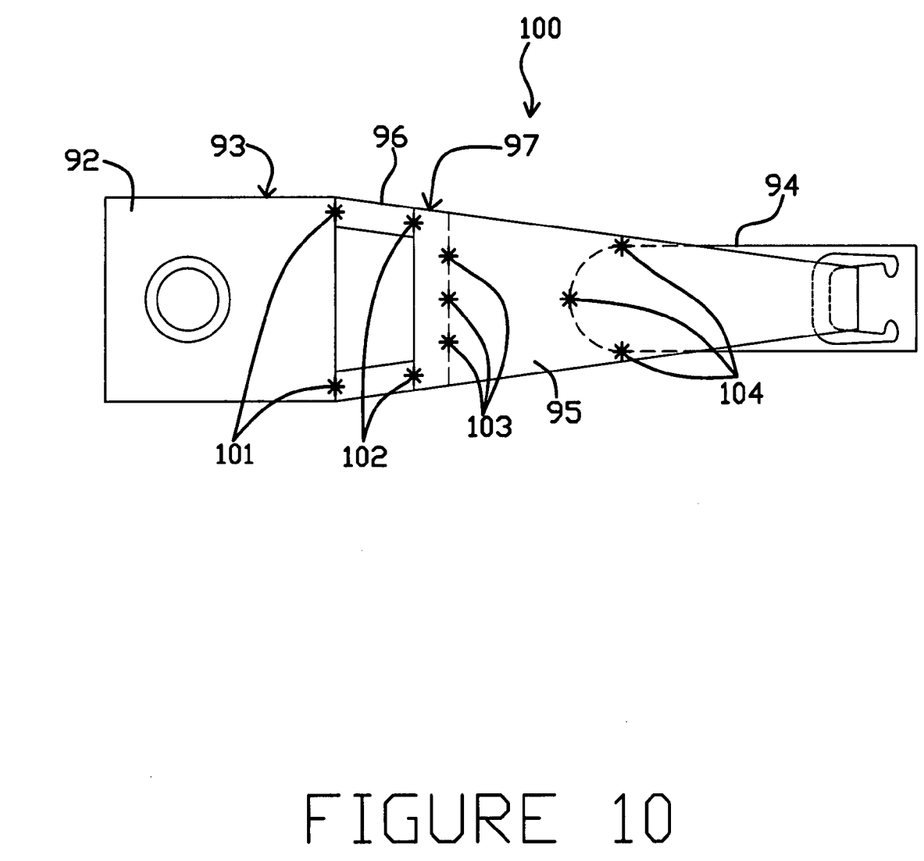
FIG. 10 is a plan view of the multi-component head suspension assembly of FIG. 9, using edge welds in the practice of the present invention.

FIGS. 9 and 10 illustrate the assembly of a multi-component suspension assembly 100. The multi-component configuration shown has as distinct components a base plate 92, a load beam mounting region 93 which includes a spring region 96, a load beam rigid region 95, and a flexure 94. FIG. 9 shows an exploded view of the distinct components. FIG. 10 illustrates the attachment of the components using edge welds to form the assembly 100. Edge welds 101 are used to attach base plate 92 to the load beam mounting region 93. Edge welds 102 attach the load beam rigid region 95 to a spring region attachment area 97. Edge welds 103 (shown in phantom) attach the load beam rigid region 95 to the spring region attachment area 97. Edge welds 104 (also shown in phantom) attach of flexure 94 to the load beam rigid region 95.

Figure 7:
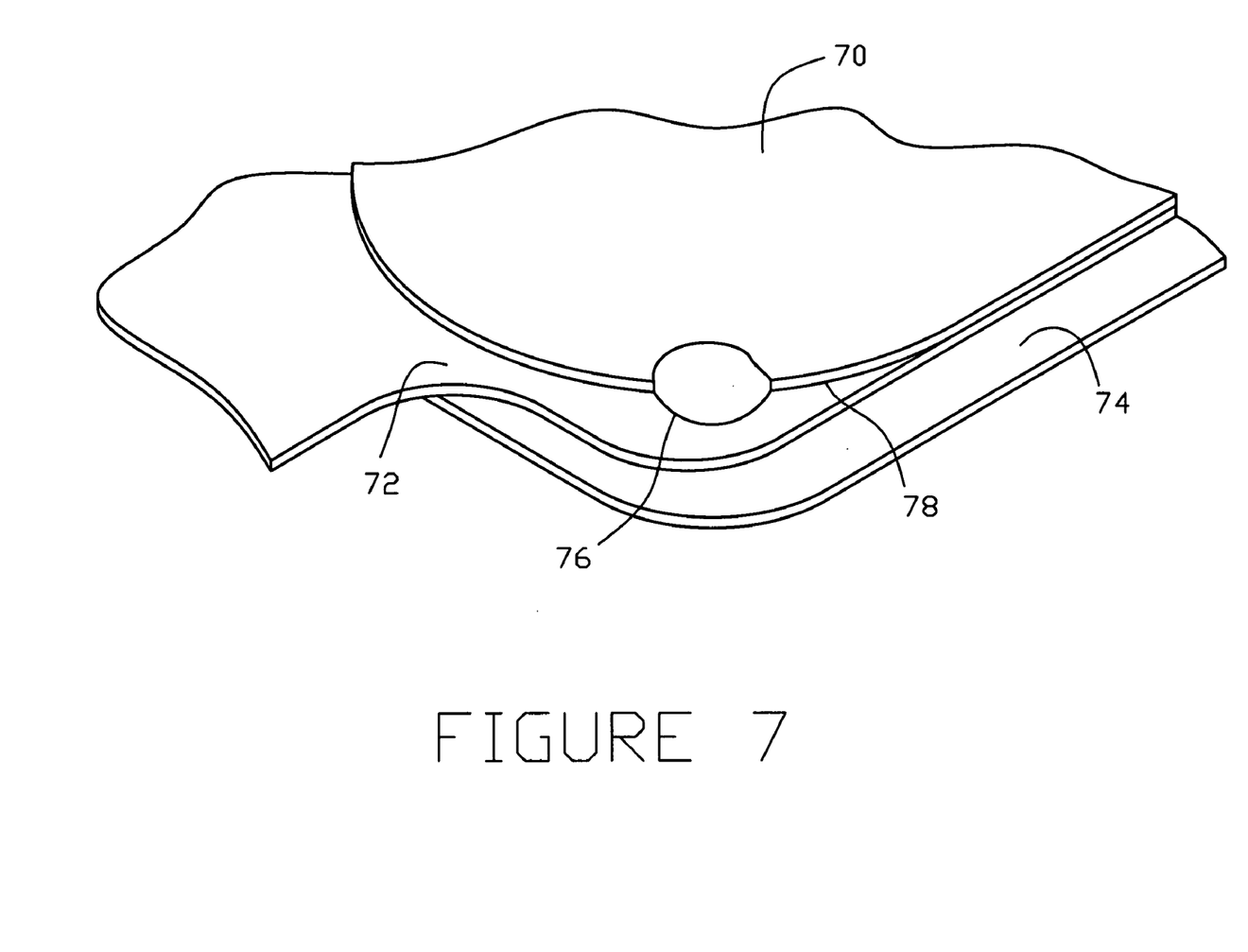
FIG. 7 is a fragmentary perspective view of an edge weld of the present invention used to attach three layers of material: a flexure, a load beam and a spring region.

It is envisioned that the method of the present invention may be used for joining more than two components (i.e., distinct layers of material) simultaneously. For example, a flexure, load beam and spring region could be simultaneously attached together by forming the weld with sufficient power to weld all three layers. FIG. 7 shows an assembly of a flexure 70, load beam 72 and spring region 74 via edge weld 76 at edge 78. It is to be understood that weld 76 extends into all three layers.

Another preferred configuration is to attach a flexure, load beam and stiffener by forming a weld through all three layers. Referring to FIG. 8, edge weld spots 87 are shown as an example of how the present method may be used to attach flexure 84, load beam 81 and stiffener 89. It is to be understood that welds 87 extend into all three layers. The example is non-limiting, however, as it is envisioned that a flexure such as flexure 84 could be attached only to a load beam such as load beam 81 via edge welds, or that a stiffener such as stiffener 89 could be attached only to a load beam such as load beam 81 via edge welds such as edge welds 88, for instance.

Although the welds shown in the various drawings are generally circular, welds resulting from the method of the present invention need not be limited to circular-shaped welds. The present invention can be used to form a linear weld or other desired edge weld configurations. By way of example, a seam weld could be formed along the edge of the first component, following a portion of the perimeter of the first component.

Furthermore, the placement of the weld formed by the present method may be varied to optimize or change the characteristics of the head suspension assembly, provided that the weld remains at an edge. The examples of weld placement shown in FIG. 1 are merely demonstrative and are not limiting. A skilled artisan will recognize that different placement and number of welds may be used, as the circumstances require.

This invention is not to be taken as limited to all of the details thereof as modifications and variations thereof may be made without departing from the spirit or scope of the invention.

What is claimed is:

1. A method for welding together at least two components of a disk drive head suspension, the method comprising the steps of:
    a) positioning a first component of the disk drive head suspension, having an edge surface, a first major surface and a second major surface that opposes the first major surface and is spaced apart from the first major surface by the edge surface, with respect to a second component of the disk drive head suspension having a surface with a perimeter, such that the surface of the second component is in overlapping contact with at least a portion of the first major surface of the first component, and at least a portion of the perimeter of the surface of the second component extends beyond the edge surface of the first component; and
    b) forming an edge weld at the edge surface, such that the edge weld extends beyond the edge surface into the second major surface of the first component and into the surface of the second component.

2. The method of claim 1, wherein step b) further includes generally centering the edge weld on the edge surface of the first component.

3. The method of claim 2 wherein the step of forming the edge weld includes applying laser energy.

4. The method of claim 3 wherein one of the first and second components comprises a flexure and the other of the first and second components comprises a load beam.

5. The method of claim 4 wherein the flexure and the load beam are fabricated from stainless steel.

6. The method of claim 5 wherein the step of forming the edge weld includes applying the laser energy from a side of the assembled components opposite a side with the exposed edge surface at which the edge weld is formed.

7. The method of claim 4 further comprising simultaneously affixing at least a third component to at least one of the flexure and the load beam.

8. The method of claim 7 wherein the third component comprises a spring region.

9. The method of claim 7 wherein the third component comprises a stiffener.

10. The method of claim 3 wherein one of the first and second components comprises a stiffener and the other of the first and second components comprises a load beam.

11. The method of claim 1 wherein the step of forming the edge weld includes applying welding energy from a side of the components on which the edge surface is located.

12. The method of claim 1 wherein the step of forming the edge weld includes applying welding energy from a side of the components that is opposite a side of the components on which the edge surface is located.

13. The method of claim 1 wherein the step of forming the edge weld includes applying laser energy.

14. The method of claim 1 wherein the step of forming the edge weld includes spot welding.

15. The method of claim 1 wherein the step of forming the edge weld includes causing a portion of both the first and second components to flow.

16. The method of claim 1 wherein one of the first and second components comprises a flexure and the other of the first and second components comprises a load beam.

17. The method of claim 1 wherein one of the first and second components comprises a spring region and the other of the first and second components comprises a load beam.

18. The method of claim 1 wherein one of the first and second components comprises a spring region and the other of the first and second components comprises a mounting region.

19. The method of claim 1 wherein one of the first and second components comprises a spring region and the other of the first and second components comprises a flexure.

20. The method of claim 1 wherein one of the first and second components comprises a stiffener and the other of the first and second components comprises a flexure.

21. The method of claim 1 wherein one of the first and second components comprises a stiffener and the other of the first and second components comprises a load beam.

22. The method of claim 1 wherein at least one of the first and second components is fabricated from stainless steel.

23. The method of claim 1 wherein at least one of the first and second components is an integrated lead suspension component.

24. The method of claim 1 wherein one of the first and second components comprises an integrated lead flexure and the other of the first and second components comprises a load beam.

25. The method of claim 1 further comprising simultaneously affixing at least a third component to at least one of the first and second components by the edge weld.

* * * * *